United States Patent [19]

Kuwabara et al.

[11] Patent Number: 4,695,593
[45] Date of Patent: Sep. 22, 1987

[54] PREFOAMED PROPYLENE POLYMER-BASE PARTICLES, EXPANSION-MOLDED ARTICLE PRODUCED FROM SAID PARTICLES AND PRODUCTION PROCESS OF SAID ARTICLE

[75] Inventors: Hideki Kuwabara, Hadano; Atsushi Kitagawa; Yoshimi Sudo, both of Fujisawa, all of Japan

[73] Assignee: Japane Styrene Paper Corporation, Tokyo, Japan

[21] Appl. No.: 831,548

[22] Filed: Feb. 21, 1986

[51] Int. Cl.$^4$ .............................................. C08J 9/24
[52] U.S. Cl. ........................................ 521/60; 264/53; 264/DIG. 7; 264/DIG. 16; 521/56; 521/143; 521/144
[58] Field of Search ...................... 521/56, 60; 264/53, 264/DIG. 7, DIG. 16

[56] References Cited

U.S. PATENT DOCUMENTS

| | | | |
|---|---|---|---|
| 4,303,756 | 12/1981 | Kajimura et al. | 521/60 |
| 4,303,757 | 12/1981 | Kajimura | 521/60 |
| 4,379,859 | 4/1983 | Hirosawa et al. | 521/60 |
| 4,399,087 | 8/1983 | Akiyama et al. | 521/60 |
| 4,415,680 | 11/1983 | Ushirokawa et al. | 521/60 |
| 4,429,059 | 1/1984 | Ozutzumi et al. | 521/60 |
| 4,436,840 | 3/1984 | Akiyama et al. | 521/60 |
| 4,448,901 | 5/1984 | Seuda et al. | 521/60 |
| 4,464,484 | 8/1984 | Yoshimura et al. | 521/60 |
| 4,504,534 | 3/1985 | Adachi et al. | 521/60 |
| 4,617,323 | 10/1986 | Kuwabara et al. | 521/60 |

*Primary Examiner*—Morton Foelak
*Attorney, Agent, or Firm*—Sherman and Shalloway

[57] ABSTRACT

Prefoamed polypropylene-base particles have a crystalline structure featuring a high-temperature peak appeared on the higher temperature side than the peak inherent to polypropylene-base resins on a DSC curve obtained by differential scanning calorimetry upon heating 1-3 mg of the prefoamed polypropylene-base particles at a constant heating rate of 10° C./min. to 220° C. by means of a differential scanning calorimeter and the internal pressure decreasing velocity coefficient k of the particles is either equal to or smaller than 0.70 ($k \leq 0.70$) at 25° C. and 1 atm. The prefoamed polypropylene-base particles can be formed into an expansion-molded polypropylene-base article by imparting foamability to the particles, filling the resultant particles in a mold and then heating the particles so as to cause their expansion. The expansion-molded article has good surface quality, excellent dimensional accuracy, and superb physical properties such as shrinkage factor, compression hardness, compression set and interparticle fusion-bonding property.

4 Claims, 2 Drawing Figures

PREFOAMED PROPYLENE POLYMER-BASE PARTICLES, EXPANSION-MOLDED ARTICLE PRODUCED FROM SAID PARTICLES AND PRODUCTION PROCESS OF SAID ARTICLE

BACKGROUND OF THE INVENTION (1) Field of the Invention

This invention relates to prefoamed propylene polymer-base particles, expansion-molded propylene polymer-base articles produced from the particles, and a process for the production of the expansion-molded polypropylene-base articles.

(2) Description of the Prior Art

The present applicant has, for many years, proceeded with researches on the production of expansion-molded articles by molding prefoamed propylene polymer-base particles, namely, by the so-called steam chest molding process. In the steam chest molding process, prefoamed particles are usually subjected to molding after an inorganic gas or a gaseous mixture of an inorganic gas and a volatile foaming agent has been introduced into the prefoamed particles and an internal pressure has thus been built up within the prefoamed particles. Even when prefoamed particles which had been pressurized and aged under the same conditions were molded successively into expansion-molded articles, the thus-obtained articles were in many instances varied in appearance and various properties such as flexibility, shrinkage factor, compression hardness, compression set and interparticle fusion-bonding property. On some occasions, their quality was poor. This tendency was particularly remarkable with highly-prefoamed particles.

SUMMARY OF THE INVENTION

The present inventors have carried out an extensive research with a view toward providing a solution to the above-described drawbacks. As a result, it has been found that causes for developing variations in physical properties of the above-described molded articles such as shrinkage factor, compression hardness, compression set and interparticle fusion-bonding property are differences in crystalline structure and internal pressure of prefoamed particles employed for their molding, leading to completion of this invention.

In one aspect of this invention, there are thus provided prefoamed propylene polymer-base particles, characterized in that said particles have a crystalline structure featuring a high-temperature peak appearing on the higher temperature side than the peak inherent to propylene polymer-base resins on a DSC curve obtained by differential scanning calorimetry upon heating 1-3 mg of the prefoamed propylene polymer-base particles at a constant heating rate of 10° C./min to 220° C. by means of a differential scanning calorimeter and the internal pressure decreasing velocity coefficient k of the particles is either equal to or smaller than 0.70 ($k \leq 0.70$) at 25° C. and 1 atm.

In another aspect of this invention, there is also provided an expansion-molded propylene polymer-base article, characterized in that said article has been obtained by imparting foamability to prefoamed propylene polymer-base particles, which have a crystalline structure featuring a high-temperature peak appearing on the higher temperature side than the peak inherent to propylene polymer-base resins on a DSC curve obtained by differential scanning calorimetry upon heating 1-3 mg of the prefoamed propylene polymer-base particles at a constant heating rate of 10° C./min to 220° C. by means of a differential scanning calorimeter and an internal pressure decreasing velocity coefficient k of 0.70 or smaller ($k \leq 0.70$) at 25° C. and 1 atm, filling the resultant particles in a mold and then heating the particles so as to cause their expansion.

In a further aspect of this invention, there is also provided a process for producing an expansion-molded propylene polymer-base article, which comprises:

imparting foamability to prefoamed propylene polymer-base particles, which have a crystalline structure featuring a high-temperature peak appeared on the higher temperature side than the peak inherent to propylene polymer-base resins on a DSC curve obtained by differential scanning calorimetry upon heating 1-3 mg of the prefoamed propylene polymer-base particles at a constant heating rate of 10° C./min to 220° C. by means of a differential scanning calorimeter and an internal pressure decreasing velocity coefficient k of 0.70 or smaller ($k \leq 0.70$) at 25° C. and 1 atm;

filling the resultant particles in a mold; and heating the particles so as to cause their expansion, thereby obtaining the article which conform in shape with the mold.

The present invention has brought about various advantageous effects. Namely, it can provide a molded article having good surface quality, excellent dimensional accuracy, and superb physical properties such as shrinkage factor, compression hardness, compression set and interparticle fusion-bonding property.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
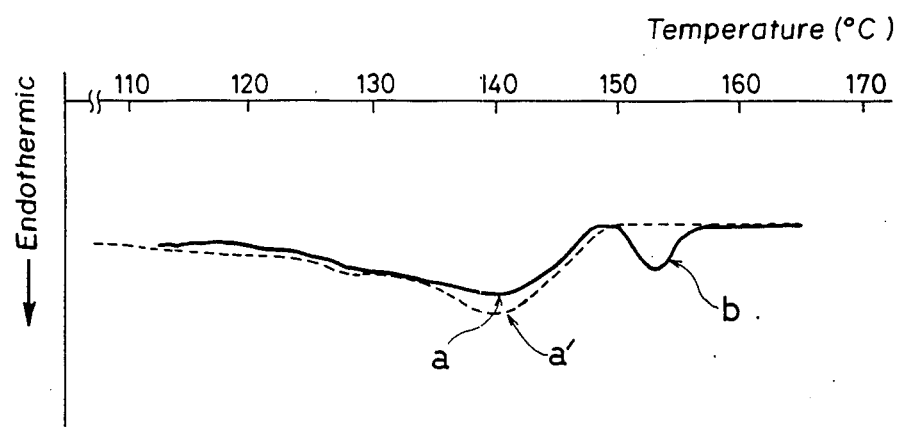
FIG. 1 is a diagram showing a DSC curve of prefoamed particles of Example 3.

As the base resin for prefoamed particles useful in the practice of this invention, propylene polymer-base resins may be employed. Specifically, it is possible to use any one of the propylene polymer-base resins (also sonetimes referred to as polypropylene-base resins) defined under JIS-K6758-1981. As exemplary propylene polymer-base resins, may be mentioned polypropylene homopolymer, ethylene-propylene block copolymers, ethylene-propylene random copolymers, and so-called polymer blends obtained by blending elastomers or 1-olefin polymers with the above-mentioned polymers. As elastomers employed for their blending with propylene polymer-base polymers, polyisobutylene, ethylene-propylene rubber and the like may be mentioned by way of example. As an illustrative 1-olefin polymer, polyethylene may be mentioned. Illustrative of blend-type base resins may include two-component blends such as propylene homopolymer/polyisobutylene and propylene copolymer/polyethylene, three-component blends such as propylene homopolymer/ethylene-propylene rubber/polyethylene, etc. They may be in either crosslinked forms or uncrosslinked forms, with the latter forms being preferred. Among the above-described polymers, ethylene-propylene random copolymers are preferred with those having ethylene contents of 0.5–10 wt. % being particularly preferred.

Prefoamend particles useful in the practice of this invention have such a crystalline structure that features a high-temperature peak appearing on the higher temperature side than the peak inherent to polypropylene-base resins on a DSC curve obtained by differential scanning calorimetry of the particles. The term "DSC curve" as used above means a DSC curve obtained when 1–3 mg of the prefoamed polypropylenebase particles is heated at a constant heating rate of 10° C./min to 220° C. by means of a differential scanning calorimeter. Let's now assume that a sample is heated at a constant heating rate of 10° C./min from room temperature to 220° C. to obtain a DSC curve which will be designated as a first DSC curve. Let's also assume that the same sample is then cooled at a constant cooling rate of 10°C./min from 220°C. to about 40° C., followed by its reheating at a constant heating rate of 10° C./min to 220°C. to obtain another DSC curve which will be designated as a second DSC curve. From these DSC curves, its inherent peak and high-temperature peak can be distinguished from each other.

Namely, the term "inherent peak" as used herein means the endothermic peak inherent to polypropylene-base resins. This peak is believed to appear due to absorption of heat upon fusion of a polypropylene-base resin, in other words, its crystals. The inherent peak appears usually in both first DSC curve and second DSC curve. In some instances, the peak temperature of the first DSC curve may somewhat differ from that of the second DSC curve. However, this difference is not greater than 5° C, usually, smaller than 2° C.

On the other hand, the term "high-temperature peak" as used herein means an endothermic peak which appears on the side higher than the inherent peak on the first DSC curve. Molded polypropylene-base articles in each of which the high-temperature peak does not appear on its DSC curve are inferior in various physical properties such as shrinkage factor, compression hardness, compression set and interparticle fusion-bonding property. Moreover, these physical properties vary significantly. The high-temperature peak is believed to appear owing to the existence of a crystalline structure which is different from the structure corresponding to the inherent peak. The high-temperature peak appears on the first DSC curve but does not appear on the second DSC curve obtained by heating the same sample under the same conditions. The high-temperature peak thus shows up because prefoamed particles useful in the practice of this invention also have a crystalline structure different from the crystalline structure which shows the peak inherent to polypropylene-base resins. It is possible to obtain prefoamed particles having a crystalline structure, which allows the high-temperature peak to appear on the DSC curve, by foaming a polypropylene-base resin under certain specific foaming conditions.

The greater the difference between the temperature corresponding to the inherent peak appearing on the second DSC curve and that corresponding to the high-temperature peak appearing on the first DSC curve, the more desirable. The difference between the temperature corresponding to the inherent peak on the second DSC curve and that corresponding to the high-temperature peak on the same curve is 5° C or greater, preferably, 10° C or greater. Since the high-temperature peak appears on the first DSC curve obtained under the above-described measurement conditions but does not show up on the second DSC, it is still possible to distinguish the inherent peak and high-temperature peak to confirm the existence or non-existence of the high-temperature peak by comparing the first DSC curve and second DSC curve with each other even when the base resin of prefoamed particles is a mixture and more than one inherent peak is likely to appear on the resulting DSC curve.

In addition to the crystalline structure featuring the high-temperature peak appeared on the above-described DSC curve, the prefoamed particles useful in the practice of this invention must have an internal pressure decreasing velocity coefficient k which is either equal to or smaller than 0.70 ($k \leq 0.70$) at 25° C. and 1 atm. More preferably, k is either equal to or smaller than 0.30 ($k \leq 0.30$). When $k > 0.70$, it is impossible to obtain molded articles having small shrinkage factors and excellent dimensional accuracy. The term "internal pressure decreasing velocity coefficient k" as used herein means the coefficient of a velocity at which gas is allowed to escape out from prefoamed particles. It is determined by the following method.

First of all, prefoamed particles with a known expansion ratio and weight are filled in a polyethylene bag which is, for example, of 70 mm×100 mm or so and defines a number of needle holes pierced therethrough. While holding the prefoamed particles at 25° C., they are pressurized by air to impart an internal pressure to them. Thereafter, the weight of the prefoamed particles is measured. The prefoamed particles are then held at 25° C. and 1 atm. Upon an elapsed time of 10 minutes, the weight of the prefoamed particles is measured. The internal pressure $P_O$ (kg/cm².G) of the prefoamed particles immediately after application of the internal pressure and the internal pressure $P_1$ (kg/cm².G) of the prefoamed particles after being held for 10 minutes at 25° C. and 1 atm are determined in accordance with the following equation:

Internal pressure of prefoamed particles (kg/cm² · G) =

$$\frac{\text{Amount of increased air (g)} \times 0.082 \times T(K) \times 1.0332}{\text{Molecular weight of air} \times \text{air volume in particles (l)}}$$

wherein the amount of increased air means the difference between the weight of the particles upon measurement of the internal pressure and that of the particles prior to the pressurizing treatment, T stands for the temperature of the atmosphere, and the air volume in the particles is a value calculated from the expansion ratio of the prefoamed particles.

From $P_0$ and $P_1$ determined by the above equation, the internal pressure decreasing velocity coefficient k is then determined in accordance with the following equation:

$$\log \frac{P_1}{P_0} = -kt$$

wherein t means time and is 10 'minutes in the above-exemplified case. The internal pressure decreasing velocity coefficient k remains either equal to or smaller than 0.70 ($k \leq 0.70$) when prefoamed particles contain fewer cells or they contain closed cells in a higher proportion. In the case of a resin containing a nucleating agent, the coefficient k may not be either equal to or smaller than 0.70 ($k \leq 0.70$) even if they contain closed cells in a higher proportion. It is thus not preferable to use prefoamed particles which are made of a resin with a nucleating agent contained therein.

The above-described prefoamed particles useful in the practice of this invention, which have the crystalline structure featuring the high-temperature peak appearing on their DSC curve and an internal pressure decreasing velocity coefficient k either equal to or smaller than 0.70 ($k \leq 0.70$) at 25° C and 1 atm, can be prepared in the following manner.

First of all, as starting polypropylene-base particles, are selected resin particles which contain neither nucleating agent nor silica or phosphorus-type stabilizer inclusion of which leads to smaller cell diameters. Prefoamed polypropylene-base particles are then prepared by a prefoaming process which comprises the following steps:

causing the polypropylene-base particles to contain a volatile foaming agent;

dispersing the resin particles in a dispersing medium in a vessel; and opening the vessel at one end thereof to release the resin particles and dispersing medium simultaneously from the vessel into an atmosphere of a pressure lower than the internal pressure of the vessel while holding the resin particles within a temperature range defined by $T_m$-20—and—$T_m$-5—, respectively wherein the melting completion temperature $T_m$ means the final temperature of an endothermic curve obtained when about 6-8 mg of the sample is heated at a constant heating rate of 10° C. by the DSC method, without raising the temperature T (°C.) of the mixture of the resin particles containing the volatile foaming agent and the dispersing medium beyond the melting completion temperature $T_m$ (°C.) of the resin particles.

Illustrative of the above-mentioned volatile foaming agent may include aliphatic hydrocarbons exemplified by propane, butane, pentane, hexane, heptane and the like, alicyclic hydrocarbons typified by cyclobutane, cyclopentane and the like, halogenated hydrocarbons such as trichlorofluoromethane, dichlorodifluoromethane, dichlorotetrafluoroethane, methyl chloride, ethyl chloride and methylene chloride, and so on. Two or more of these foaming agents may be used in combination. The foaming agent may be used in an amount of 0.04-0.20 mole or so per 100 parts by weight of polypropylene-base particles.

In the above process, the resin particles and volatile foaming agents may be separately dispersed in the dispersing medium. Alternatively, they may be dispersed in the dispersing medium after the resin particles have been caused to contain the volatile foaming agent. Upon dispersion, it is possible to use a dispersing agent, e.g., ultrafine particulate aluminum oxide, titanium oxide, basic magnesium carbonate, basic zinc carbonate, calcium carbonate or the like if necessary. Such a dispersing agent may be used generally in an amount of 0.01-10 parts by weight per 100 parts by weight of resin particles. On the other hand, any dispersing medium may be employed so long as it does not dissolve the resin particles. For example, water, ethylene glycol, glycerin, methanol, ethanol and the like may be used either singly or in combination. Water is generally preferred.

In the above manner, prefoamed particles having a crystalline structure featuring the high-temperature peak appearing on their DSC curve and an internal pressure decreasing velocity coefficient k either equal to or smaller than 0.70 ($k \leq 0.70$) at 25° C. and 1 atm can be obtained. Usually, these prefoamed particles have an apparent expansion ratio of 5-60 times.

It is also possible to obtain particles having an apparent expansion ratio of up to about 150 times by pressurizing prefoamed particles, which have been obtained in the above-described manner, with an inorganic gas such as air, nitrogen or carbon dioxide or a gaseous mixture of such an inorganic gas and a volatile foaming agent to impart an elevated internal pressure to the prefoamed particles and then heating the thus-pressurized particles.

In the present invention, prefoamed particles which have been obtained in the above-described manner are imparted with foamability. The application of foamability to the prefoamed particles may be effected by pressurizing them with an inorganic gas, for example, air, nitrogen gas, carbon dioxide or the like, a volatile foaming agent employed above for foaming the prefoamed particles such as butane, dichlorodifluoromethane, dichlorotetrafluoroethane or the like, or a gaseous mixture of the inorganic gas and volatile foaming agent. Usually, the prefoamed particles are pressurized with air to build up an internal pressure ranging from atmospheric pressure to 3 kg/cm$^2$.G therewithin. The foamability-imparted prefoamed particles (i.e., imparted with an internal pressure of atmospheric pressure or higher) are filled in a mold. The prefoamed particles are then heated to have them expand, whereby the particles are fusion-bonded to obtain a molded article conforming with the mold. As the heating means for the above molding operation, steam of 2 kg/cm$^2$.G-5 kg/cm$^2$.G is usually employed.

The expansion-molded polypropylene-base article has smooth surfaces, and is excellent in dimensional accuracy and interparticle fusion-bonding strength and also superb in various physical properties such as compression hardness, compression set and shrinkage factor. The molded article may be used, for example, as a packaging material, cushioning material, lagging material, heat-insulating material, building material, vehicle component material, buoyancy material, foods container or the like.

The present invention will hereinafter be described in further detail by the following Examples and Comparative Examples.

EXAMPLES 1-5

Charged in a 5-l autoclave were 100 parts by weight of particles of an ethylene-propylene random copolymer (ethylene content: 35 wt. %; melt flow index: 8 g/10 min; $T_m$: 150° C.) which contained BHT (antioxidant), "Irganox 1010 (antioxidant)" and calcium stearate respectively in amounts of 0.1 part by weight, 0.03 part by weight and 0.05 part by weight, each, per 100 parts by weight of the base resin, 300 parts by weight of water, 0.3 part by weight of ultrafine particulate aluminum oxide and dichlorodifluoromethane in the amount given in Table 1. With stirring, the contents were heated and held for 30 minutes at the foaming temperature shown in the same table. While maintaining the internal pressure of the autoclave at 30 kg/cm$^2$.G with nitrogen gas, tha autoclave was opened at one end thereof to release the resin particles and water under atmospheric pressure so that the resin particles were caused to expand, thereby obtaining prefoamed particles. The expansion ratios of the thus-obtained prefoamed particles are given in Table 2. In Example 5, the prefoamed particles obtained by causing the starting resin particles to expand in Example 2 were pressurized further with air and were then heated. This procedure was repeated twice to achieve the expansion ratio of 65 times. The internal pressure decreasing velocity coefficients and differential scanning calorimetric data of the thus-obtained prefoamed particles are also given in Table 2. Besides, a DSC curve of the prefoamed particles of Example 3 is shown in FIG. 1, in which a,a' indicate inherent peaks, b indicates a high-temperature peak, the solid curve is a first DSC curve and the dashed curve is a second DSC curve.

Thereafter, these prefoamed particles were pressurized with air to impart the internal pressure given in Table 2 to the particles. They were then filled in a metal mold of 300 mm×300 mm×50 mm (internal dimensions) and heated with steam of 2.8–3.5 kg/cm$^2$.G, whereby the prefoamed particles were caused to expand to obtain an expansion-molded article. After allowing the thus-obtained expansion-molded article to age for 24 hours in an oven of 55° C., measurements were made on the density, compression hardness, compression set, shrinkage factor and surface quality of the molded article and the fusion-bonding property of the prefoamed particles in the molded article. Results are also shown in Table 2.

Comparative Example 1

Figure 2:
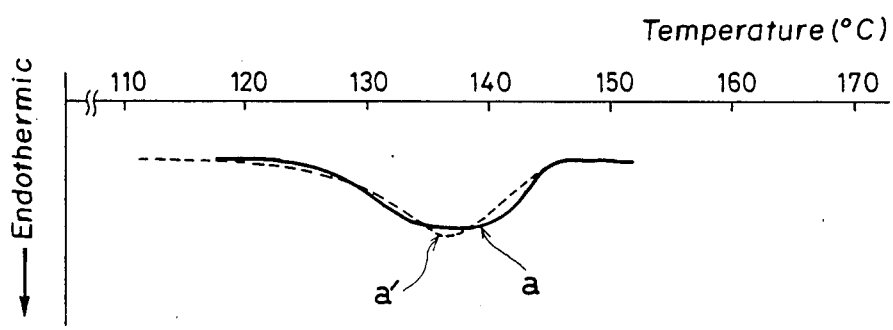
FIG. 2 is a diagram illustrating a DSC curve of prefoamed particles of Comparative Example 1.

Charged in a 5-l autoclave were 100 parts by weight of the same particles of ethylene-propylene random copolymer as those employed in Example 1, 300 parts by weight of water, 0.3 parts by weight of ultrafine particulate aluminum oxide and dichlorodifluoromethane in the amount shown in Table 1. After heating the contents to the maximum intra-autoclave temperature given in the same table, they were cooled to 140° C. at which they were held for 15 minutes. Thereafter, while maintaining the internal pressure of the autoclave at 30 kg/cm2.G with nitrogen gas, the autoclave was opened at one end thereof and the resin particles and water were released under atmospheric pressure, whereby the resin particles were caused to expand to obtain prefoamed particles. Measurements were made on the expansion ratio and internal pressure decreasing velocity coefficient of the thus-obtained prefoamed particles. The prefoamed particles were also subjected to differential scanning calorimetry. Results are given in Table 2. Besides, a DSC curve of the prefoamed particles is shown in FIG. 2, in which the solid curve is a first DSC curve, the dashed curve is a second DSC curve and a,a' indicate inherent peaks.

After imparting the internal pressure given in Table 2 to the prefoamed particles, they were molded in the same manner as in Example 1 to obtain a molded article. Various physical properties of the thus-obtained molded article are given in Table 2.

Example 6

Charged in a 5-l autoclave were 100 parts by weight of particles of an ethylene-propylene random copolymer (which had the same ethylene content, melt flow index and Tm as the ethylene-propylene random copolymer employed in Example 1) containing silica (antiblocking agent) in an amount of 0.2 part by weight per 100 parts by weight of the base resin, 300 parts by weight of water, 0.3 part by weight of ultrafine particulate aluminum oxide and dichlorodifluoromethane in the amount given in Table 1. After holding with stirring the contents at 137° C. for 30 minutes without heating them beyond the maximum intra-autoclave temperature given in the same table, the resin particles and water were released under atmospheric pressure in the same manner as in Example 1 to obtain prefoamed particles. The expansion ratio and internal pressure decreasing velocity coefficient of the thus-obtained prefoamed particles were measured. They were also subjected to differential scanning calorimetry. Results are given in Table 2.

An expansion-molded article was next obtained in the same manner as in Example 1, using the above-obtained foamed particles. Physical properties of the expansion-molded article are also shown in Table 2.

Comparative Example 2

Charged in a 5-l autoclave were 100 parts by weight of particles of an ethylene-propylene random copolymer (which had the same ethylene content, melt flow index and Tm as the ethylene-propylene random copolymer employed in Example 1) containing dibenzylidenesorbitol (nucleating agent) in an amount of 0.2 part by weight per 100 parts by weight of the base resin, 300 parts by weight of water, 0.3 part by weight of ultrafine particulate aluminum oxide and dichlorodifluoromethane in the amount given in Table 1. After holding with stirring the contents at 137° C. for 30 minutes without heating them beyond the maximum intra-autoclave temperature given in the same table, the resin particles and water were released under atmospheric pressure in the same manner as in Example 1 to obtain prefoamed particles. The expansion ratio and internal pressure decreasing velocity coefficient of the thus-obtained prefoamed particles were measured. They were also subjected to differential scanning calorimetry. Results are given in Table 2.

An expansion-molded article was next obtained in the same manner as in Example 1, using the above-obtained foamed particles. Physical properties of the expansion-molded article are also shown in Table 2.

TABLE 1

| | Foaming conditions | | |
|---|---|---|---|
| | Dichlorodi-fluoromethane (wt. parts) | Maximum intra-autoclave temp. (°C.) | Foaming temp. (°C.) |
| Example | | | |
| 1 | 11 | 140 | 137 |
| 2 | 15 | 140 | 138 |
| 3 | 20 | 140 | 138 |
| 4 | 18 | 140 | 140 |
| 5 | — | — | — |
| 6 | 18 | 137 | 137 |
| Comp. Ex. | | | |
| 1 | 18 | 155 | 140 |
| 2 | 18 | 140 | 140 |

TABLE 2

|  | Example 1 | Example 2 | Example 3 | Example 4 | Example 5 | Example 6 | Comp. Ex. 1 | Comp. Ex. 2 |
|---|---|---|---|---|---|---|---|---|
| Prefoamed particles | | | | | | | | |
| Apparent expansion ratio (times) | 7 | 15 | 35 | 48 | 65 | 40 | 38 | 58 |
| DSC curve | | | | | | | | |
| High-temperature peak | Appeared | Appeared | Appeared | Appeared | Appeared | Appeared | Not app'd | Appeared |
| $\Delta T^{(1)}$ | 10 | 12 | 13 | 13 | 13 | 11 | — | 12 |
| Internal pressure decreasing velocity coefficient k (25° C., 1 atm) | 0.16 | 0.12 | 0.20 | 0.28 | 0.12 | 0.35 | 0.29 | 0.82 |
| Internal pressure after pressurizing treatment (kg/cm$^2$ · G) | 2.5 | 1.0 | 1.3 | 1.2 | 1.5 | 1.3 | 1.3 | 1.4 |
| Molded article | | | | | | | | |
| Density (g/cm$^3$) | 0.13 | 0.06 | 0.026 | 0.02 | 0.014 | 0.023 | 0.025 | 0.03 |
| Compression hardness$^{(2)}$ | | | | | | | | |
| Measurement value (kg/cm$^3$) | 4.0 | 2.2 | 0.9 | 0.6 | 0.52 | 0.55 | 0.52 | 0.48 |
| Judgement | | | | | | Δ | X | X |
| Compression set$^{(3)}$ | | | | | | | | |
| Measurement value (%) | 7 | 8 | 8.5 | 10.1 | 12.9 | 20 | 40 | 50 |
| Judgement | | | | | | Δ | X | X |
| Shrinkage factor$^{(4)}$ | | | | | | | Δ | X |
| Surface quality$^{(5)}$ | | | | | | Δ | Δ | X |
| Fusion-bonding property$^{(6)}$ | | | | | | | | |
| Overall evaluation | | | | | | | X | X |

Note:
$^{(1)}\Delta T$ means the temperature difference between the temperature corresponding to a high-temperature peak and that corresponding to an inherent peak.
$^{(2)}$Measured in accordance with JIS-K6767. Judgment was made in accordance with the following standard, based on the values of compression hardness divided by their corresponding densities:
25 and up . . .
20–24 . . . Δ
19 and down . . . X
$^{(3)}$Compression sets were measured in accordance with JIS-K6767. Judgement was made in accordance with the following standard:
Smaller than 15% . . .
15% (inclusive) - 30% (exclusive) . . . Δ
30% and greater . . . X
$^{(4)}$The shrinkage factor (%) of each molded article along a surface thereof relative to the corresponding dimension of its corresponding mold was measured. Measurement results were judged in accordance with the following standard:
Smaller than 3% . . .
3% (inclusive) - 5% (exclusive) . . . Δ
5% and greater . . . X
$^{(5)}$The surface quality of each molded article was visually observed. Results were judged in accordance with the following standard:
No surface shrinkage . . .
Some surface shrinkage . . . Δ
Severe surface shrinkage . . . X
$^{(6)}$A tensile strength test was conducted on each molded article in accordance with JIS-K6767A. Test results were judged in accordance with the following standard:
Material breakage only . . .
Both material and interparticle breakage . . . Δ
Interparticle breakage only . . . X

Having now fully described the invention, it will be apparent to one of ordinary skill in the art that many changes and modifications can be made thereto without departing from the spirit or scope of the invention as set forth herein.

What is claimed is:

1. A process for producing an expansion-molded propylene polymer-base article, which comprises:
    imparting foamability to prefoamed propylene polymer-base particles, which have a crystalline structure featuring a high-temperature peak appearing on the higher temperature side than the peak inherent to the propylene polymer-base resin on the DSC curve obtained by differential scanning calorimetry upon heating 1–3 mg of the prefoamed propylene polymer-base particles at a constant heating rate of 10° C./min to 220° C. by means of a differential scanning calorimeter and an internal pressure decreasing velocity coefficient k of 0.70 or smaller (k≦0.70) at 25° C. and 1 atm;
    filling the resultant particles in a mold; and
    heating the particles so as to cause their expansion, thereby obtaining the articles which conform in shape with the mold.

2. The process for producing an expansion-molded propylene polymer-base article according to claim 1, wherein the internal pressure decreasing velocity coefficient k is either equal to or smaller than 0.30 (k≦0.30).

3. The process of claim 1 wherein the propylene polymer of the base particles is an uncrosslinked ethylene-propylene random copolymer.

4. The process of claim 3 wherein the ethylene-propylene random copolymer has an ethylene content of from 0.5–10 weight percent.

* * * * *